(12) United States Patent
Colibro et al.

(10) Patent No.: US 9,368,109 B2
(45) Date of Patent: Jun. 14, 2016

(54) METHOD AND APPARATUS FOR AUTOMATIC SPEAKER-BASED SPEECH CLUSTERING

(71) Applicant: Nuance Communications, Inc., Burlington, MA (US)

(72) Inventors: Daniele Ernesto Colibro, Allesandria (IT); Claudio Vair, Borgone Susa (IT); Kevin R. Farrell, Medford, MA (US)

(73) Assignee: Nuance Communications, Inc., Burlington, MA (US)

( * ) Notice: Subject to any disclaimer, the term of this patent is extended or adjusted under 35 U.S.C. 154(b) by 314 days.

(21) Appl. No.: 13/907,364

(22) Filed: May 31, 2013

(65) Prior Publication Data

US 2014/0358541 A1 Dec. 4, 2014

(51) Int. Cl.
*G10L 19/00* (2013.01)
*G10L 21/00* (2013.01)
*G10L 15/00* (2013.01)
*G10L 15/26* (2006.01)
*G10L 15/06* (2013.01)
*G10L 17/00* (2013.01)
*G10L 13/06* (2013.01)
*G10L 25/00* (2013.01)
(Continued)

(52) U.S. Cl.
CPC ............ *G10L 15/063* (2013.01); *G10L 17/04* (2013.01)

(58) Field of Classification Search
CPC ....... G10L 15/22; G10L 15/08; G10L 15/063; G10L 15/265; G10L 15/02; G10L 17/005; G10L 19/12; H05K 999/99; G06F 19/18; C12Q 1/6883

USPC ............ 702/19; 435/6.11; 704/219, 245, 250, 704/275, 236, 243, 240, 267, 235, 270, 246, 704/249

See application file for complete search history.

(56) References Cited

U.S. PATENT DOCUMENTS 6,411,930 B1 * 6/2002 Burges .......................... 704/240
6,442,519 B1 * 8/2002 Kanevsky et al. ............. 704/243
(Continued)

OTHER PUBLICATIONS

Apsingekar, V. R. and De Leon, P. L., "Speaker Model Clustering for Efficient Speaker Identification in Large Population Applications," *IEEE Transactions on Audio, Speech, and Language Processing*, 17(4):848-853 (2009).
(Continued)

*Primary Examiner* — Pierre-Louis Desir
*Assistant Examiner* — Anne Thomas-Homescu
(74) *Attorney, Agent, or Firm* — Hamilton, Brook, Smith & Reynolds, P.C.

(57) ABSTRACT

Reliable speaker-based clustering of speech utterances allows improved speaker recognition and speaker-based speech segmentation. According to at least one example embodiment, an iterative bottom-up speaker-based clustering approach employs voiceprints of speech utterances, such as i-vectors. At each iteration, a clustering confidence score in terms of Silhouette Width Criterion (SWC) values is evaluated, and a pair of nearest clusters is merged into a single cluster. The pair of nearest clusters merged is determined based on a similarity score indicative of similarity between voiceprints associated with different clusters. A final clustering pattern is then determined as a set of clusters associated with an iteration corresponding to the highest clustering confidence score evaluated. The SWC used may further be a modified SWC enabling detection of an early stop of the iterative approach.

20 Claims, 8 Drawing Sheets

(51) Int. Cl.
*G01N 33/48* (2006.01)
*C12Q 1/68* (2006.01)
*G10L 17/04* (2013.01)

(56) References Cited

U.S. PATENT DOCUMENTS

| | | | | |
|---|---|---|---|---|
| 6,567,776 | B1* | 5/2003 | Chang et al. | 704/236 |
| 8,171,027 | B1* | 5/2012 | Andrade-Cetto | 707/737 |
| 8,630,860 | B1* | 1/2014 | Zhang et al. | 704/275 |
| 8,913,103 | B1* | 12/2014 | Sargin et al. | 348/14.12 |
| 2005/0009069 | A1* | 1/2005 | Liu et al. | 435/6 |
| 2005/0209982 | A1* | 9/2005 | Jin | G06N 3/126 706/13 |
| 2006/0229823 | A1* | 10/2006 | Liu et al. | 702/19 |
| 2009/0319269 | A1* | 12/2009 | Aronowitz | 704/243 |
| 2010/0145707 | A1* | 6/2010 | Ljolje et al. | 704/267 |
| 2011/0119060 | A1* | 5/2011 | Aronowitz | 704/250 |
| 2011/0251843 | A1* | 10/2011 | Aronowitz | 704/235 |
| 2012/0095764 | A1* | 4/2012 | Jeon et al. | 704/246 |
| 2012/0253811 | A1* | 10/2012 | Breslin et al. | 704/249 |
| 2013/0006633 | A1* | 1/2013 | Grokop et al. | 704/245 |
| 2013/0096922 | A1* | 4/2013 | Asaei et al. | 704/270 |
| 2013/0144414 | A1* | 6/2013 | Kajarekar et al. | 700/94 |
| 2013/0300939 | A1* | 11/2013 | Chou et al. | 348/700 |
| 2014/0029757 | A1* | 1/2014 | Aronowitz et al. | 381/59 |
| 2014/0074467 | A1* | 3/2014 | Ziv et al. | 704/235 |
| 2014/0142944 | A1* | 5/2014 | Ziv et al. | 704/250 |
| 2014/0214420 | A1* | 7/2014 | Yao et al. | 704/243 |
| 2014/0337027 | A1* | 11/2014 | Ide | 704/245 |
| 2014/0379332 | A1* | 12/2014 | Rodriguez et al. | 704/219 |

OTHER PUBLICATIONS

Iso, K.-i., "Speaker Clustering Using Vector Quantization and Spectral Clustering," *ICASSP*:4986-4989 (2010).

Prazak, J. and Silovsky, J., "Speaker Diarization Using PLDA-based Speaker Clustering," *The 6th IEEE International Conference on Intelligent Data Acquisition and Advanced Computing Systems: Technology and Applications*: 347-350 (2011).

Rousseeuw, P. J., "Silhouettes: A Graphical Aid to the Interpretation and Validation of Cluster Analysis," *Journal of Computational and Applied Mathematics* 20:53-65 (1987).

van Leeuwen, D.A., "Speaker Linking in Large Data Sets," *The Speaker and Language Recognition Workshop*:202-208 (2010).

Senoussaoui, M., et al., "Efficient Iterative Mean Shift Based Cosine Dissimilarity for Multi-Recording Speaker Clustering," Pre-Publication Paper, (no date given).

Extended European Search Report, EP 14170662, "Method and Apparatus for Automatic Speaker-Based Speech Clustering," dated Oct. 7, 2014.

J. Choo, et al., "MOSAIC: A Proximity Graph Approach for Agglomerative Clustering," XP019098992, ISBN 9783540745525, pp. 231-240 (Sep. 3, 2007).

X. A. Miro, et al., "Speaker Diarization: A Review of Recent Research," *IEEE Transactions on Audio, Speech, and Language Processing*, 20(2): 356-370 (Feb. 2012).

M. Rouvier and S. Meignier, "A Global Optimization Framework for Speaker Diarization," *Odyssey 2012: The Speaker and Language Recognition Workshop*, XP055140140, pp. 1-5, (Jun. 25, 2012).

A. Solomonoff, et al., "Clustering Speakers by Their Voices," *Acoustics, Speech and Signal Processing, Proceedings of the 1998 IEEE International Conference*, Seattle, WA, XP010279341, ISBN 9780780344280, vol. 2, pp. 757-760 (May 12-15, 1998).

W. Tsai, et al., "Clustering Speech Utterances by Speaker Using Eigenvoice-Motivated Vector Space Models," *2005 IEEE International Conference on Acoustics, Speech, and Signal Processing*, Philadelphia, PA, vol. 1, pp. 725-728 (Mar. 18-23, 2005).

* cited by examiner

| Test Condition | Best ARI value | EER% (SV Test) | Found clusters (perfect, wrong, perfect clusters percentage) |
|---|---|---|---|
| 1conv | 0.956 | 0.73% | 317 (262, 55, 82.65%) |
| 30 sec | 0.912 | 1.93% | 345 (220, 125, 63.77%) |
| 20 sec | 0.869 | 3.13% | 341 (184, 173, 51.13%) |
| 10 sec | 0.652 | 6.13% | 434 (72, 362, 16.59%) |

FIG. 4A

| Test Condition | Best ARI value | EER% (SV Test) | Found clusters (perfect, wrong, perfect clusters percentage) |
|---|---|---|---|
| 1conv | 0.894 | 1.67% | 1382 (1346, 36, 97.39%) |
| 30 sec | 0.798 | 1.92% | 1392 (1320, 72, 94.83%) |
| 20 sec | 0.676 | 2.64% | 1401 (1284, 117, 91.65%) |
| 10 sec | 0.449 | 5.00% | 1408 (1231, 177, 87.43%) |

FIG. 5A

METHOD AND APPARATUS FOR AUTOMATIC SPEAKER-BASED SPEECH CLUSTERING

BACKGROUND OF THE INVENTION

Applications and systems employing speech-based user interaction have been deployed across various platforms, such as mobile phones, automated teller machines (ATMs), customer service platforms, and the like. Such applications and systems have been gaining attraction by the companies deploying the platforms as well as by customers using the platforms.

SUMMARY OF THE INVENTION

According to at least one example embodiment, a method and corresponding apparatus for clustering a plurality of voiceprints of speech utterances into multiple clusters associated with multiple speakers of the speech utterances, comprises: defining a clustering pattern having multiple clusters, each of the multiple clusters including at least one of the plurality of voiceprints; iteratively, (1) evaluating a clustering confidence score in terms of silhouette width criterion (SWC) values associated with at least a subset of the plurality of voiceprints, the clustering confidence score representing a clustering validation metric, and (2) updating the clustering pattern by merging a pair of nearest clusters, among clusters associated with the clustering pattern, into a single cluster, the pair of nearest clusters merged being determined based on a similarity score indicative of similarity between voiceprints associated with different clusters; and providing an indication of a final clustering pattern, the final clustering pattern being determined as the clustering pattern corresponding to a highest value of the clustering confidence score.

According to an example implementation, the voiceprints are i-vectors corresponding to the speech utterances. For each speech utterance, one or more i-vectors are generated. In evaluating the SWC values, a modified SWC, with a penalty term when evaluated for voiceprints assigned to clusters having two voiceprints, is employed. The clustering confidence score may be evaluated as the average of the SWC values associated with the plurality of voiceprints.

The similarity score, between a first cluster and a second cluster, may be the minimum value of a similarity metric evaluated between pairs of vector representations, with one vector representation of each pair being associated with the first cluster and the other vector representation being associated with the second cluster; the maximum value of a similarity metric evaluated between pairs of vector representations, with one vector representation of each pair being associated with the first cluster and the other vector representation being associated with the second cluster; or the average of similarity metric values evaluated between pairs of vector representations, with one vector representation of each pair being associated with the first cluster and the other vector representation being associated with the second cluster.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4A and 4B illustrate simulation results, based on the National Institute of Standards and Technology (NIST) SRE08 test set, of a clustering method according to an example implementation; and FIGS. 5A and 5B illustrate simulation results, based on the Linguistic Data Consortium (LDC) Fisher test set, of a clustering method according to an example implementation.

DETAILED DESCRIPTION OF THE INVENTION

A description of example embodiments of the invention follows.

The teachings of the patent application Ser. No. 13/762,213 and the patent application Ser. No. 13/856,992 are incorporated herein by reference in their entireties.

Increased interest in speech-based interaction applications and other applications or systems employing processing of speech signals from multiple speakers have been driving research in speaker-based speech clustering, e.g., unsupervised classification of speech signals based on voice characteristics of respective speakers. Reliable speaker-based speech clustering enables efficient acoustic model adaptation, enhances speaker recognition systems, and allows implementation of security modules for detecting fraudsters based on corresponding voice characteristics.

Typical speaker-based speech clustering approaches usually employ spectrum-based features extracted from audio utterances. The grouping of audio utterances into clusters may be based on the elbow criterion, which is based on ratios of group variance to total variance, information criteria, e.g., Akaike Information Criterion (AIC), Bayesian Information Criterion (BIC), Deviance Information Criterion (DIC), or other criteria. In the following, a speaker-based speech clustering approach employing i-vectors, or other feature parameters, and a silhouette criterion is presented.

Figure 1A:
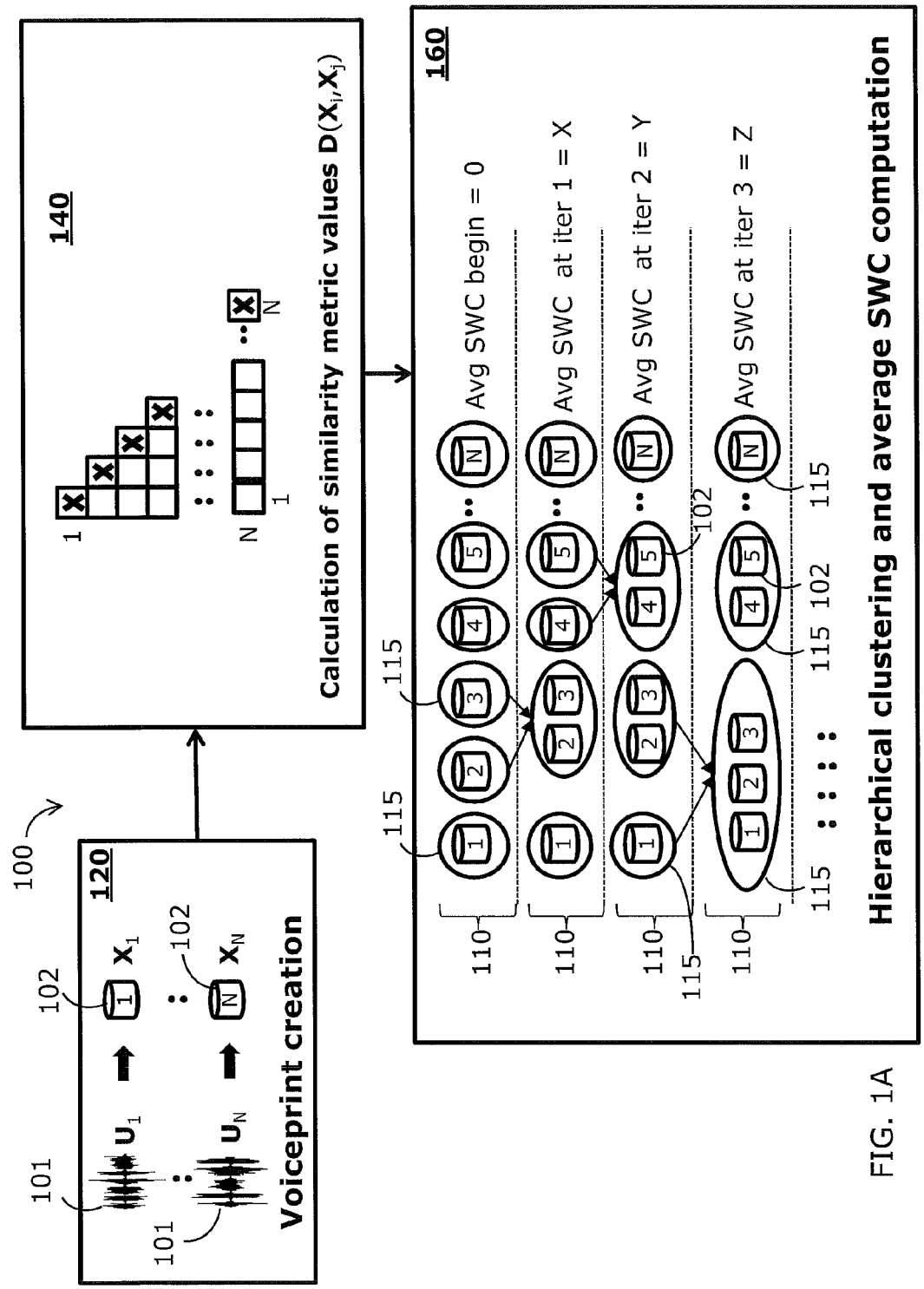
FIG. 1A is a flow diagram illustrating a mechanism of speaker-based speech clustering, according to at least one example embodiment.

FIG. 1A is a flow diagram illustrating a mechanism 100 of speaker-based speech clustering, according to at least one example embodiment. Given a plurality of audio utterances 101, e.g., $U_1, \ldots, U_N$, corresponding voiceprints 102, e.g., $X_1, \ldots, X_N$, are calculated at block 120. Voiceprints 102 may be i-vectors, super-vectors, or other parameters representing, or modeling, speaker voice characteristics associated with the audio utterances 101. An audio utterance 101 may correspond to a single speaker. Alternatively, an audio utterance 101 may represent a conversation between multiple speakers. According to an example embodiment, the number of voiceprints 102 calculated for a given audio utterance 101 depends on the number of speakers associated with the given audio utterance 101. For example, if i-vectors are employed, the number of i-vectors calculated for a given audio utterance 101 is equal to the number of speakers associated with the given audio utterance 101. In the case where an utterance 102 represents a conversation between more than one speaker, a manual or automatic segmentation is performed on the conversation utterance to divide the speech of the participant speakers and to extract the related i-vectors. Examples of methods of i-vector calculation are described in U.S. patent application Ser. No. 13/762,213 and U.S. patent application Ser. No. 13/856,992, which are incorporated herein by reference in their entireties.

At block 140, a similarity metric D( ) is evaluated for pairs of voiceprints ($X_i$, $X_j$). The calculated similarity metric values $D(X_i, X_j)$ represent how similar, or how different, are the pairs of voiceprints ($X_i$, $X_j$). The similarity metric is symmetrical, hence $D(X_i, X_j)=D(X_j, X_i)$. The similarity metric D( ) may be defined in a way that the lower the similarity metric value $D(X_i, X_j)$, the more similar are the voiceprints $X_i$ and $X_j$. Examples of such similarity metric D( ) include the Euclidean distance, Manhattan distance, Maximum norm distance, Mahalanobis distance, and the like. Alternatively, the similarity metric D( ) may be defined in a way that the higher the similarity metric value $D(X_i, X_j)$, the more similar are the voiceprints $X_i$ and $X_j$. Examples of such a similarity metric D( ) include the inverse of the Euclidean distance, the cosine similarity score, i.e., $$D(X_i, X_j) = \frac{x_i \cdot x_j}{|x_i||x_j|},$$

the correlation score, i.e., $$D(X_i, X_j) = \frac{(x_i - \overline{x_i}) \cdot (x_j - \overline{x_j})}{|x_i||x_j|}$$

where $\overline{X_i}$ and $\overline{X_j}$ are respectively the means of $X_i$, or the like. Other similarity metrics, typically used for comparing i-vectors, are data-driven trained classifiers, such as Linear Discriminant Analysis (LDA) and Within-Class Covariance Normalization (WCCN) cosine scoring, Probabilistic Linear Discriminant Analysis (PLDA), Support Vector Machines (SVM) and Neural Networks. Such classifiers are trained on data sets including labeled i-vectors of different speakers, and produce a similarity score when comparing i-vectors. The higher the produced similarity score, the more similar are the i-vectors and the likelihood that they belong to the same speaker. According to at least one example implementation, the similarity metric D( ) is pre-processed, e.g., adjusted, shifted, or normalized, so that the produced values $D(X_i, X_j)$ are positive.

According to an example embodiment, a similarity metric value $D(X_i, X_j)$ is calculated for each pair of i-vectors. Given N i-vectors, the total number of similarity metric values may be stored in an N×N symmetric matrix with each entry (i,j) of the matrix representing the similarity metric value $D(X_i, X_j)$ between the $i^{th}$ and $j^{th}$ i-vectors. For the sake of memory efficiency, just the lower triangular score matrix may be retained, as shown in block 140. The diagonal entries of the matrix may be ignored or set to a pre-defined value. According to at least one example implementation, calculating and storing the similarity metric value $D(X_i, X_j)$, while it may consume memory space, it reduces computational complexity by avoiding repetitive calculations.

At block 160, a hierarchical clustering of the voiceprints 102 is performed. The hierarchical clustering is an iterative bottom-up, or agglomerative, clustering approach. According to at least one example embodiment, a clustering pattern 110 arranging the voiceprints 102, e.g., i-vectors, into a number of clusters 115 is updated by merging the two nearest clusters at each iteration into a single cluster. Initially, a clustering pattern is defined with one or more voiceprints 102, e.g., i-vectors, assigned to each cluster. For example, an initial clustering pattern may be defined in a way that each of its clusters 115 initially includes, or is associated with, a single voiceprint 102, e.g., i-vector.

According to at least one example embodiment, a clustering confidence score, based on the Silhouette Width Criterion (SWC), is calculated at each iteration. The Silhouette Width Criterion represents a metric of interpretation and validation of clusters of data. The SWC provides succinct information of how well each object lies within its cluster. In other words, the SWC represents a metric of how well the clustering pattern 110 groups relatively similar i-vectors, or any other feature parameters, into a same cluster and allocates relatively different i-vectors, or any other feature parameters, to different clusters.

Assume a clustering pattern 110 with K clusters, e.g., $C_k$, k=1, . . . , K. Each cluster $C_k$ has $N_k$ voiceprints 102, e.g., i-vectors, where $\Sigma_{k=1}^{K} N_k=N$. According to at least one example embodiment, the SWC is evaluated for each voiceprint 102. In evaluating the SWC for a given voiceprint $X_i$ within a cluster $C_k$, an average similarity function $a(X_i)$, representing the similarity of $X_i$ with respect to all other voiceprints $X_j$ within the same cluster $C_k$, is calculated. That is, $a(X_i)=\text{avg}(D(X_i, X_j))$ where $X_i$ and $X_j$ both belong to $C_k$. Also, another average similarity function $\beta_l(X_i)$ representing the similarity of $X_i$ with respect to all other voiceprints $X_j$ within a cluster $C_l \neq C_k$, is calculated for each cluster $C_l$, of the clustering pattern 110, different from the cluster $C_k$. That is $\beta_l(X_i)=\text{avg}(D(X_i, X_j))$ where $X_i$ belong to $C_k$, $X_j$ belong to $C_l$, and $C_l \neq C_k$. In the following, $b(X_i)$ is equal to $\beta_l(X_i)$ that corresponds to the cluster $C_l$ that is closest to the voiceprint $X_i$ for all l≠k. That is, $b(X_i)=\min_{l \neq k} \beta_l(X_i)$ or $b(X_i)=\max_{l \neq k} \beta_l(X_i)$, depending on whether the similarity metric D( ) decreases with increased similarity between a pair ($X_i$, $X_j$), or, respectively, the similarity metric D( ) increases with increased similarity between a pair ($X_i$, $X_j$).

According to at least one example embodiment, the SWC for the voiceprint $X_i$ may be defined as $$s(X_i) = \frac{b(X_i) - a(X_i)}{\max(a(X_i), b(X_i), m)} \text{ or as}$$

$$s(X_i) = \frac{a(X_i) - b(X_i)}{\max(a(X_i), b(X_i), m)}$$

depending on whether the similarity metric D( ) decreases with increased similarity between a pair ($X_i$, $X_j$), or, respectively, the similarity metric D( ) increases with increased similarity between a pair ($X_i$, $X_j$). The parameter m is a small value, e.g., a value in the range 0.001 to 0.1, used to avoid dividing by zero. For clusters with a single voiceprint, it is assumed that the SWC satisfies $s(X_i)=0$, for voiceprints $X_i$ by convention.

Figure 1B:
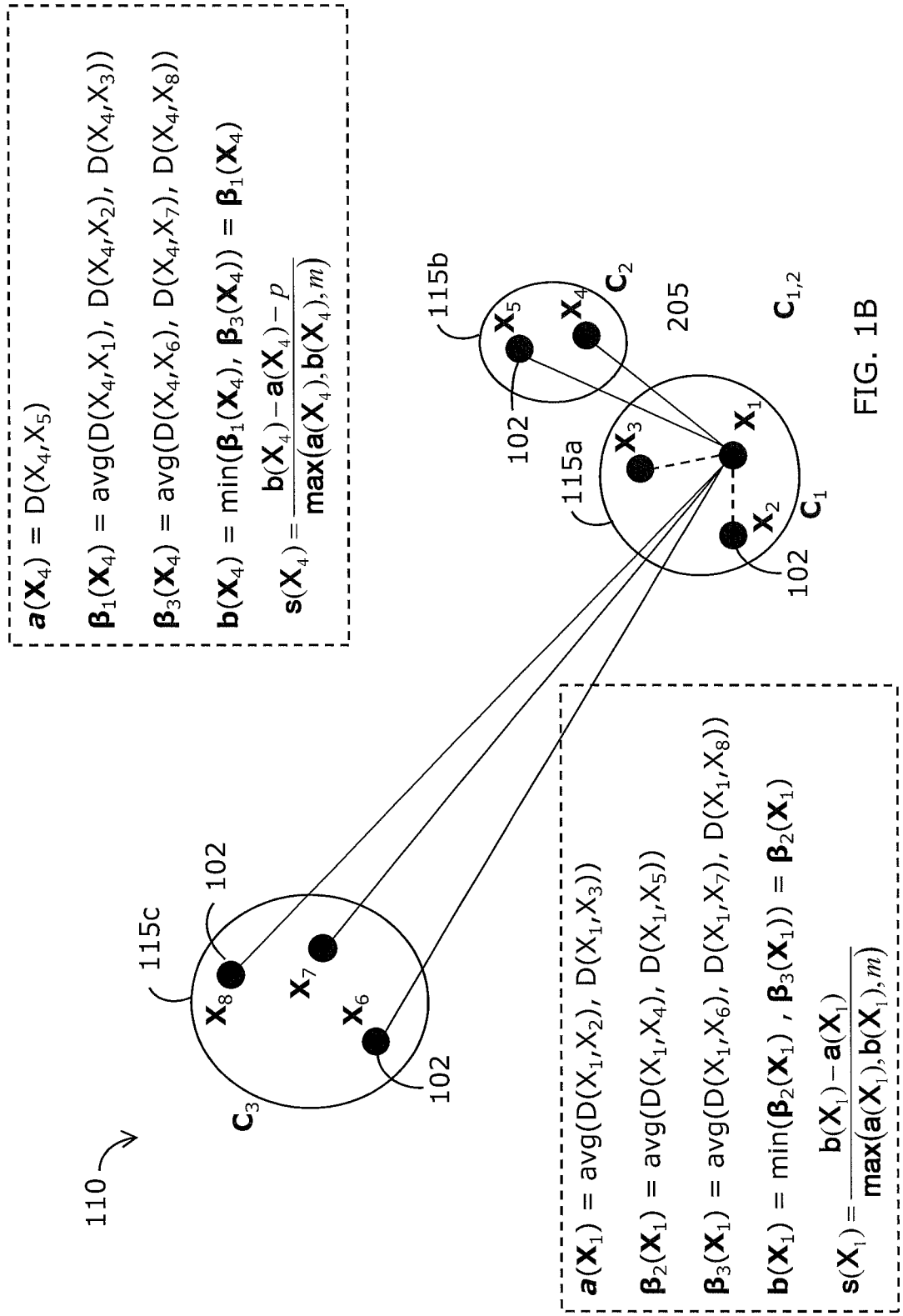
FIG. 1B is a graphical representation of an example clustering pattern illustrating the evaluation of the SWC for a particular voiceprint, according to an example embodiment.

FIG. 1B is a graphical representation of an example clustering pattern 110 illustrating the evaluation of the SWC for a particular voiceprint, according to an example embodiment. The clustering pattern 110 includes three clusters $C_1$, $C_2$, and $C_3$, 115a-c. The cluster $C_1$ includes voiceprints $X_1$, $X_2$, and $X_3$, cluster $C_2$ includes voiceprints $X_4$ and $X_5$, and cluster $C_3$ includes voiceprints $X_6$, $X_7$, and $X_8$. According to the example embodiment in FIG. 1B, average similarity functions $a(X_i)$, $\beta_l(X_i)$, $b(X_i)$, and the SWC $s(X_i)$ are evaluated based on Euclidean distances between pairs of voiceprints. Specifically, for the voiceprint $X_1$ within the cluster $C_1$, the average similarity function a($X_1$) is defined as the average of the Euclidean distances between voiceprint $X_1$ and the other two voiceprints $X_2$ and $X_3$ in the same cluster $C_1$. That is, a($X_1$)=(½) (D($X_1,X_2$)+D($X_1,X_3$)). The average similarity function $\beta_2(X_1)$ is defined as the average of the Euclidean distances between the voiceprint $X_1$ and the voiceprints $X_4$ and $X_5$ in the cluster $C_2$, e.g., $\beta_2(X_1)$=(½) (D($X_1,X_4$)+D($X_1,X_5$)). Similarly, the average similarity function $\beta_3(X_1)$ is defined as $\beta_3(X_1)$=(⅓) (D($X_1,X_6$)+D($X_1,X_7$)+D($X_1,X_8$)). The similarity value b($X_1$) is equal to $\beta_2(X_1)$ since the voiceprints $X_4$ and $X_5$ in $C_2$ are closer to $X_1$ than the voiceprints $X_6$, $X_7$, and $X_8$ assigned to cluster $C_3$, according to the geometry of the clusters $C_1$, $C_2$, and $C_3$ as shown in FIG. 1B. Finally, the SWC is $$s(X_1) = \frac{a(X_1) - b(X_1)}{\max(a(X_1), b(X_1), m)}$$

if the similarity metric value D($X_i, X_j$) increases with increasing similarity between the pair ($X_i, X_j$). The SWC is $$s(X_1) = \frac{b(X_1) - a(X_1)}{\max(a(X_1), b(X_1), m)}$$

if the similarity metric value D($X_i, X_j$) decreases with increasing similarity between the pair ($X_i, X_j$), e.g., as $X_i$ and $X_j$ get closer to each other. A person skilled in the art should appreciate that different distances, other than the Euclidean distances, or other dissimilarity measures may be employed when evaluating dissimilarity scores a($X_i$), $\beta_1(X_i)$, b($X_i$), and the SWC s($X_i$).

The average similarity function a($X_i$) represents a measure of how well does $X_i$ fit within the cluster it is assigned to. In other words, a($X_i$) indicates how close is $X_i$ to its peer voiceprints that are assigned to the same cluster. A good match between $X_i$ and its respective cluster is indicated by a low value of a($X_i$), or a high value of a($X_i$), depending on whether the similarity metric D( ) decreases with increased similarity between a pair ($X_i, X_j$), or, respectively, the similarity metric D( ) increases with increased similarity between a pair ($X_i, X_j$). The average similarity function $\beta_1(X_i)$ provides a measure of how close, or how similar, is $X_i$ to voiceprints within the cluster $C_1$ where $X_i$ belongs to cluster $C_k$ which is different from $C_1$. The cluster with the lowest or highest, depending on the similarity metric D( ) employed, average similarity function value $\beta_1(X_i)$, among all clusters $C_1$, with l≠k, may be viewed as the "neighboring cluster" of $X_i$. As such, the average similarity function value b($X_i$) represents how close is $X_i$ to its "neighboring cluster." The lower, or higher (depending on the similarity metric D( ) employed), the value of b($X_i$), the closer is $X_i$ to its "neighboring cluster."

Depending on the type of similarity metric D( ) used, the SWC function s($X_i$) increases when a($X_i$) gets smaller than b($X_i$), e.g., if D($X_i, X_j$) is inversely proportional to similarity between $X_i$ and $X_j$, or if a($X_i$) gets larger than b($X_i$), e.g., if D($X_i, X_j$) is proportional to similarity between $X_i$ and $X_j$. The larger is the SWC value s($X_i$), the better is the clustering of the voiceprint $X_i$ with respect to other voiceprints. Similarly, the smaller is the SWC value s($X_i$), the worse is the clustering of the voiceprint $X_i$ with respect to other voiceprints. Also a SWC value s($X_i$) close to zero indicates that the voiceprint $X_i$ is on the border of two natural clusters. It is worth noting that for a cluster with a single voiceprint, the SWC value for the corresponding voiceprint is forced to zero. Given that the values D($X_i, X_j$) of the similarity metric D( ) are positive, the SWC satisfies $-1 \leq s(X_i) \leq 1$. If the similarity metric D( ) is not positive by definition, the similarity metric D( ) may be preprocessed or modified, e.g., positive-shifted, normalized, or corresponding absolute value is used, to guarantee positive values.

Since each s($X_i$) is a measure of how well the corresponding voiceprint $X_i$ is clustered with respect to other voiceprints in the clustering model 110, the average of the SWC values corresponding to the various voiceprints is employed as a clustering confidence score, according to at least one example embodiment. The average of the SWC values is a measure of how well does the clustering, in the corresponding clustering pattern 110, reflect similarities between voiceprints within the same cluster and dissimilarities between voiceprints from different clusters. In other words, the average SWC corresponding to a given clustering pattern 110 is a cumulative measure of how well the voiceprints 102 are clustered. Accordingly, in an iterative approach where the clustering pattern 110 is iteratively updated, the best clustering pattern among multiple iterations may be found by recording and comparing the corresponding SWC averages.

The usage of the classical formulation based on SWC average confidence as stopping criterion works well in most situations for agglomerative clustering. Unfortunately the performance is not good in one specific situation that is of great importance for many speaker clustering applications. This troublesome scenario happens when almost all the utterances involved in the clustering process have been spoken by different speakers. This condition motivates the need for detecting an early stop condition to terminate the clustering process after a limited number of iterations. The classical average SWC confidence is not suited for early stop detection because, in early clustering phases, the most similar elements are grouped together. Consequently, the SWC of the voiceprints regrouped in a cluster with more than one element are positive because the distance inside the cluster are lower, or higher if the similarity metric D( ) increases with higher similarity, than the distance to the neighboring cluster. Therefore, the average SWC value increases for a non-negligible number of iterations as the nearest voiceprints are grouped typically in clusters of two elements. Due to the classical average SWC definition, such grouping happens irrespective of whether the voiceprints in a group have been spoken by the same speaker or not. The average SWC starts decreasing just when the agglomerative clustering process starts creating clusters of 3 elements. At this point, the intra-cluster distance increases, or decreases if the similarity metric D( ) increases with higher similarity, due to the addition of the third element. As such, the neighboring cluster distance may be lower, or higher depending on the similarity metric D( ), than the intra-cluster one, leading to a decreasing average of the SWC values over iterations. For this reason, in the situation where almost all the utterances have been spoken by different speakers, the classical average SWC method terminates the clustering too late, upon which a sizeable number of incorrect aggregations have been performed. The problem is mainly caused by the initial aggregations that consist mostly of clusters with 2 elements.

According to an example embodiment, a modified SWC is employed for voiceprints associated with clusters having a total of two voiceprints. Specifically, for a voiceprint $X_i$ belonging to a cluster having a total of two voiceprints, the SWC is defined as $$s(X_i) = \frac{a(X_i) - b(X_i) - p}{\max(a(X_i), b(X_i), m)} \text{ or as}$$

$$s(X_i) = \frac{b(X_i) - a(X_i) - p}{\max(a(X_i), b(X_i), m)},$$

depending on the similarity metric D( ) employed. The parameter p is a penalty term greater than zero and is used to regularize the SWC function $s(X_i)$. The new term penalizes the initial aggregations and, in particular, clusters with two voiceprints, and only aggregations having a meaningful margin between the intra-cluster and neighboring cluster distances results in a positive $s(X_i)$. By regularizing the behavior of the SWC function, the introduced penalty term p allows coping with the early stop detection condition. It is worth noting that the $s(X_i)$ values are penalized only for the voiceprints that are included in clusters with two voiceprints. Restricting the voiceprints for which the penalty term is applied to the SWC avoids affecting the overall optimal stopping condition when an early detection is not needed. Finally, the addition of the penalty term p can, in theory, make the SWC values $s(X_i)$ less than −1, for particular values of $a(X_i)$ and/or $b(X_i)$. Even if this is rare in real applications, such possibility may be prevented, for example, by forcing the value of $s(X_i)$ to be equal to −1 in the cases where $$s(X_i) = \frac{a(X_i) - b(X_i) - p}{\max(a(X_i), b(X_i), m)} \text{ or}$$

$$s(X_i) = \frac{b(X_i) - a(X_i) - p}{\max(a(X_i), b(X_i), m)},$$

result in a value lower than −1.

According to at least one example embodiment, the value of p depends on the similarity metric D( ) used. In general, the larger the range of the similarity measure, the higher is the penalty term p. Typically, p may be defined as a small percentage of the range of the similarity values for i-vectors belonging to a same speaker. For instance, when using the LDA WCCN cosine similarity and producing values in the range [0,2], following a positive shift of the cosine values, a penalty of 0.005 may be a reasonable value. When using a normalized PLDA score, e.g., with PLDA values being normalized, the similarity scores may be in the range [0, 20], where higher scores mean more similar voiceprints. In this case, a good choice for the penalty term may be 0.5. According to at least one example implementation, the similarity scores are normalized in such a way that they are guaranteed to be positive for avoiding issues in the SWC computation. A value of p that is too large may penalize merging voiceprints corresponding to the same speaker.

Once all the SWC values $s(X_i)$ are computed for all voiceprints $X_i$ in the clustering pattern 110, at a given iteration, a respective average, e.g., $$\frac{1}{N}\sum_{i=1}^{N} s(X_i),$$

is computed as the clustering confidence score value for the corresponding clustering pattern 110. A person skilled in the art should appreciate that the clustering confidence score may be defined in other ways, other than the average of the SWC values $s(X_i)$. In a general, the clustering confidence score may be defined as $h(s(X_1), \ldots, s(X_N))$, where h may represent a median function, weighted average function, minimum function, maximum function, or the like.

At a given iteration, besides computing the clustering confidence score, the clustering pattern 110 is also updated, at block 160, by merging the two nearest clusters based on a similarity score evaluated between different clusters. For example, considering FIG. 1B, the clustering pattern 110 shown therein may be assumed to be corresponding to an iteration associated with the hierarchical clustering in block 160. According to at least one example embodiment, similarity scores between pairs of clusters, e.g., $(C_1, C_2)$, $(C_1, C_3)$, and $(C_2, C_3)$, of the clustering pattern 110 are calculated. For example, the similarity score between a given pair of clusters, e.g., $(C_1, C_2)$, $(C_1, C_3)$, or $(C_2, C_3)$, may be calculated based on a similarity metric $D(X_i, X_j)$ between pairs of voiceprints 102 associated with the same given pair of clusters. Based on the computed similarity scores, the clusters $C_1$ and $C_2$ are determined to be the two clusters nearest to each other within the clustering pattern 110, and are then merged into a single cluster, e.g., cluster $C_{1,2}$. Therefore, after the merging, the clustering pattern 110 includes only two clusters, e.g., $C_{1,2}$ and $C_3$.

Figure 2A:
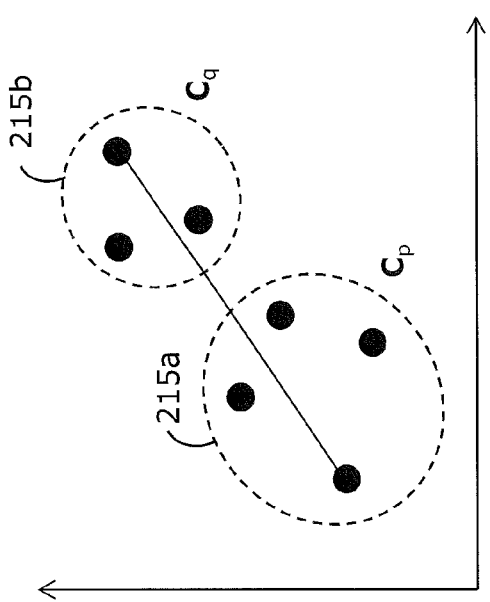
FIGS. 2A-2D are graphical representations illustrating different examples of a similarity score between a pair of clusters.

FIGS. 2A-2D are graphical representations illustrating different examples of a similarity score between a pair of clusters $C_p$ 215a and $C_q$ 215b. The figure assumes similarity measure based on Euclidean distance. In FIG. 2A, the similarity score between the clusters $C_p$ 215a and $C_q$ 215b is defined as the minimum value $D(X_i, X_j)$ among all voiceprint pairs $(X_i, X_j)$ with, for example, $X_i$ being in the cluster 215a and $X_j$ being in the cluster 215b. That is, the similarity score $\Delta(C_p, C_q)$ is defined as $\Delta(C_p, C_q)=\min(D(X_i, X_j))$ for all $(X_i, X_j)$ such that $X_i \in C_p$ and $X_j \in C_q$.

Figure 2B:
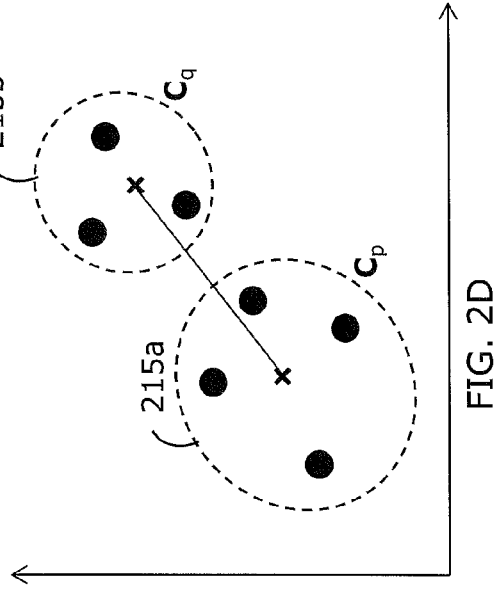

In FIG. 2B, the similarity score between the clusters $C_p$ 215a and $C_q$ 215b is defined as the maximum value $D(X_i, X_j)$ among all voiceprint pairs $(X_i, X_j)$ with, for example, $X_i$ being in the cluster 215a and $X_j$ being in the cluster 215b. That is, the similarity score $\Delta(C_p, C_q)$ is defined as $\Delta(C_p, C_q)=\max(D(X_i, X_j))$ for all $(X_i, X_j)$ such that $X_i \in C_p$ and $X_j \in C_q$.

Figure 2C:
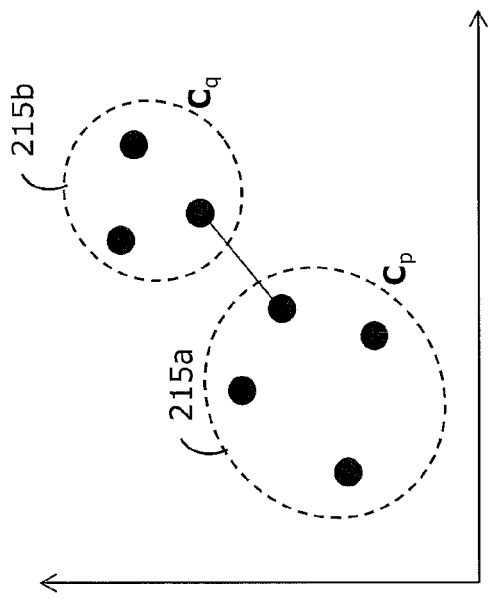

In FIG. 2C, the similarity score between the clusters $C_p$ 215a and $C_q$ 215b is defined based on the average of the $D(X_i, X_j)$ values measured between all pairs of voiceprints $(X_i, X_j)$ with, for example, $X_i$ being in the cluster 215a and $X_j$ being in the cluster 215b. That is, the similarity score $\Delta(C_p, C_q)$ is defined as $\Delta(C_p, C_q)=\text{avg}(D(X_i, X_j))$ for all $(X_i, X_j)$ such that $X_i \in C_p$ and $X_j \in C_q$.

Figure 2D:
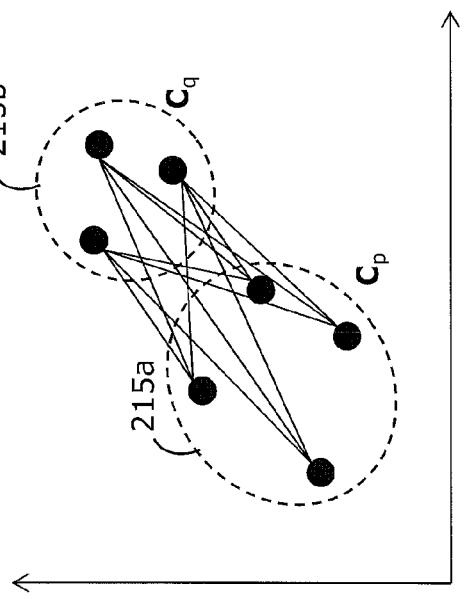

In FIG. 2D, the similarity score between the clusters $C_p$ 215a and $C_q$ 215b is defined based on the value of the similarity metric D( ) evaluated between voiceprint centroids associated with cluster $C_p$ 215a and cluster $C_q$ 215b. Specifically, the centroid $Y_p$ of voiceprints in the cluster $C_p$ and the centroid $Y_q$ of voiceprints in the cluster $C_q$ are first computed. The similarity score $\Delta(C_p, C_q)$ is the calculated as $\Delta(C_p, C_q)=D(Y_p, Y_q)$.

The processes, at block 160, of calculating the clustering confidence score, e.g., the SWC $s(X_i)$, and updating the clustering pattern 110, by merging the respective two nearest clusters, are repeated over multiple iterations. A computed clustering confidence score value is recorded for each iteration. The recorded clustering confidence score values are used to determine the best clustering pattern achieved through the multiple iterations. The final clustering pattern is determined as the one corresponding to the maximum clustering confidence score recorded over multiple iterations.

The calculation of the SWC average and the updating of the clustering pattern 110 may be performed until the clustering pattern 110 is reduced to a single cluster. Alternatively, a stopping criterion may be employed to avoid an exhaustive iterative approach. For example, the iterative approach may be stopped once the average SWC becomes smaller than a defined threshold value, e.g., a negative threshold value. According to another example, the iterative approach may be stopped once the average SWC exhibits a decreasing behavior over a number of consecutive iterations. A person or ordinary skill in the art should appreciate that other stopping criteria that may be used to stop the iterative approach after the highest average SWC is already achieved may be employed.

Figure 3:
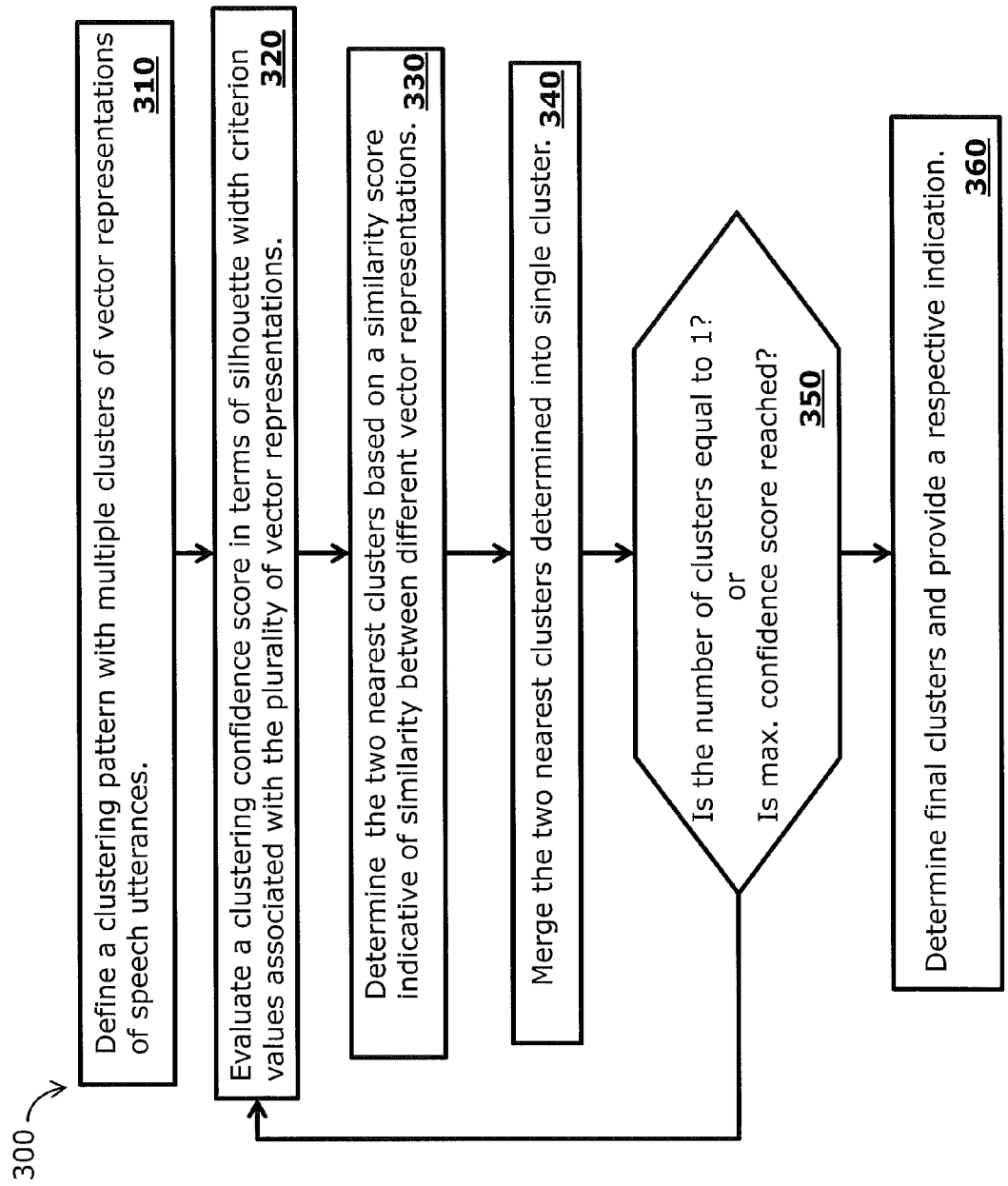
FIG. 3 is a flowchart illustrating a method of clustering a plurality of vector representations of speech utterances into multiple clusters associated with multiple speakers of the speech utterances.

FIG. 3 is a flowchart illustrating a method 300 of clustering a plurality of vector representations, e.g., i-vectors, of speech utterances into multiple clusters associated with multiple speakers of the speech utterances. At block 310, a clustering pattern 110 having multiple clusters of speech utterances is initially defined. For example, the clustering pattern 110 may be defined in a way that each cluster is assigned a single vector representation of the plurality of vector representations. Alternatively, a cluster among the multiple clusters may be assigned more than one vector representation.

At block 320, a clustering confidence score is evaluated in terms of SWC values associated with at least a subset of the plurality of vector representations. According to an example embodiment, a modified SWC is employed. Specifically, a penalty term is used for vector representations assigned to clusters having two vector representations. At block 330, the two nearest clusters among clusters of the clustering pattern 110 are determined based on a similarity metric. In particular, similarity scores associated with various pairs of vector representations, corresponding to respective pairs of clusters, are evaluated in terms of the similarity metric. The two nearest clusters are determined based on the computed similarity scores. The determined two nearest clusters are then merged into a single cluster at block 340. The processes in the blocks 320, 330, and 340 are repeated iteratively, and the computed clustering confidence scores at various iterations are stored, until the clustering pattern is reduced to a single cluster 350. Alternatively, the iterative processing may be stopped based on a stopping criterion indicating that a maximum value of the clustering confidence score is already reached 350. A final clustering pattern is determined based on the recorded values of the clustering confidence score, and an indication of the final clustering pattern is provided.

According to an example embodiment, the final clustering pattern is provided to a speaker recognition engine, for example, to be employed in speaker recognition. The final clustering pattern may also be used to perform speaker-based segmentation of a speech signal representing a conversation between more than one speaker.

Figure 4B:
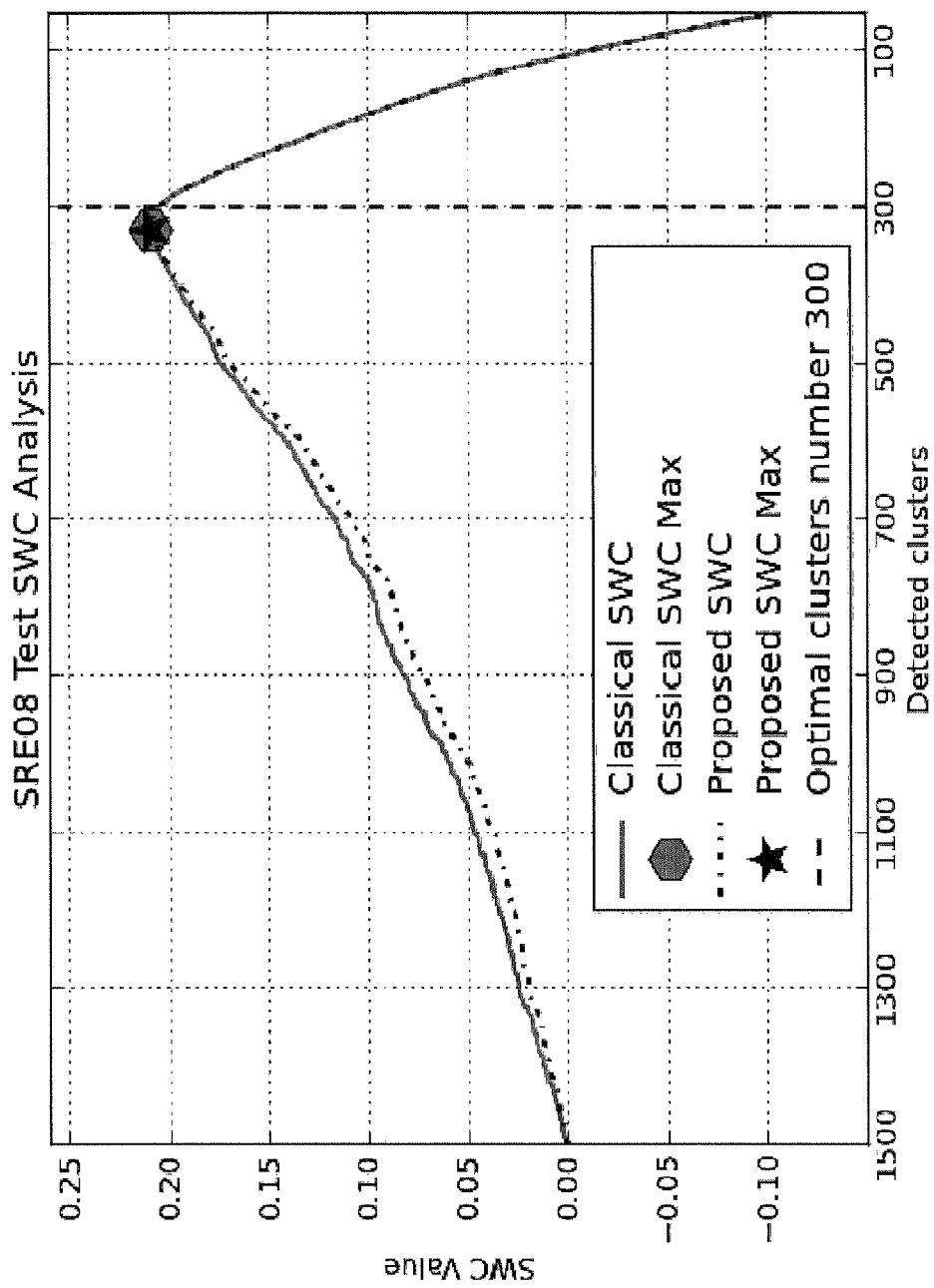

FIGS. 4A and 4B illustrate computer simulation results, based on the NIST Speaker Recognition Evaluation 2008 (SRE08) test data set, of an example embodiment of the clustering approach presented herein. In the implementation used in the computer simulations, the clustering pattern 110 is initially defined as a plurality of single-voiceprint clusters, and is iteratively updated until it is reduced to a single cluster. The similarity metric D( ) employed is the normalized PLDA score, e.g., PLDA values are normalized. In this case, the larger the score the more similar the i-vectors are, and this scoring method is one of the most accurate for i-vectors trained on speech utterances. In determining the nearest clusters at each iteration, the similarity score $\Delta(C_p, C_q)$ is defined as $\Delta(C_p, C_q) = \max(D(X_i, X_j))$ for all $(X_i, X_j)$ such that $X_i \in C_p$ and $X_j \in C_q$, as described in FIG. 2B.

The SRE08 test set is based on speech audio recordings coming from the Mixer corpus, which involves mainly American English recordings but there are also few recordings in other languages, mainly Mandarin, Russian and Arabic. The speech average duration of an utterance is about 140 seconds. This test set has been configured for a quite homogeneous situation, where there are 300 reference speakers, each one having exactly 5 audio recordings or utterances.

FIG. 4A is a table illustrating the final clustering results for four different computer simulations with corresponding four test conditions indicated in the first column of the table. Specifically, according to the first test condition, denoted as "lconv," whole conversations of the SRE08 test set are used as audio utterances for which i-vectors are computed and clustered. In clustering the i-vectors, the modified SWC, e.g., with penalty term for clusters having two i-vectors, is employed. According to the second, third, and fourth test conditions, the recorded conversations of the SRE08 test set are divided into audio utterances of duration equal to, respectively, 30 seconds, 20 seconds, and 10 seconds.

The table columns represent, respectively, the considered test condition, the best Adjusted Rand Index (ARI) value, the Equal Error Rate (EER) of the speaker verification test associated with the SRE08 test data set, and the performance of the clustering method 300 in terms of the number of clusters. Specifically, the last column of the table includes the number of clusters in the final output clustering pattern 110 provided in each clustering simulation, the number of perfect clusters among the clusters output in each clustering simulation, the number of wrong clusters among the clusters output in each clustering simulation, and the percentage of perfect clusters among the clusters output in each clustering simulation. A perfect cluster is one where all the input audio utterances associated with a single actual speaker are in the same cluster and no utterances from other speakers are included in the same cluster. A wrong cluster is one that does not perfectly represent audio utterances associated with a single actual speaker.

From the table of FIG. 4A, it is clear that the test condition where whole conversations are used as audio utterances whose i-vectors are clustered outperforms all the other test conditions. It is also evident that even for the test conditions with audio utterance duration equal to 30 and 20 seconds, the corresponding resulting ARI values are still high even though the number of perfect clusters found is smaller compared that of the "lconv" test condition. In fact, the ARI provides a measure about the overall clustering correctness in terms of the plurality of audio utterances associated with the SRE08 test data set. Hence, the clustering quality provided by the simulated clustering approach is quite high even for audio utterances with duration equal to 30 and 20 seconds. In other words, the wrong clusters are mostly clusters with a single or very few i-vectors that are wrongly clustered. However, the clustering performance clearly degrades, whether in terms of the ARI or in terms of the number of perfect clusters, when using audio utterances with duration of 10 seconds.

FIG. 4B shows graphical plots illustrating the recorded averages of the classical and modified SWC, over multiple iterations, corresponding to the "lconv" test condition shown in the table of FIG. 4A. When using the classical SWC, no penalty term is introduced, and the corresponding SWC averages are shown by the continuous line. When using the modified SWC, a penalty term p is introduced for i-vectors assigned to clusters having two i-vectors and the corresponding SWC averages are shown by the dashed line. The maximum recorded SWC average, for the classical and modified SWC, are similar and equal to 317 for the SRE08 test data set. That is, the classical and modified SWC result in similar clustering performance with the SRE08 test data set.

Figure 5B:
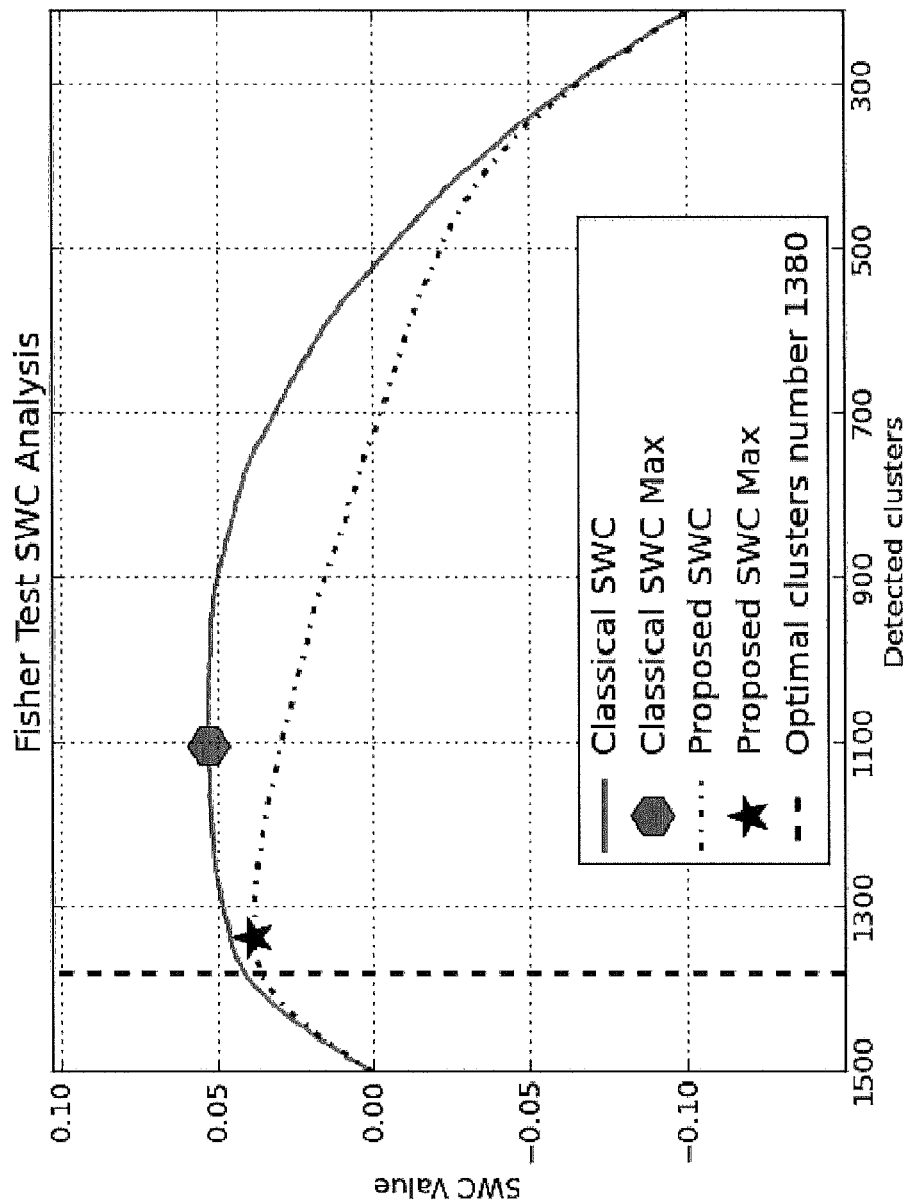

FIGS. 5A and 5B illustrate computer simulation results, based on the Fisher test data set, of an example embodiment of the clustering approach presented herein. The test conditions and the clustering approach are the same as described above with respect to FIGS. 4A and 4B. That is, the clustering pattern 110 is initially defined as a plurality of clusters with a single i-vector each and the modified SWC is employed. Also, the same similarity metric is used.

The Fisher test set has been built on the Fisher corpus released by Linguistic Data Consortium (LDC). This corpus involves a large number of American English speakers, e.g., more than 10,000, and includes more than 20,000 conversational speech audio recordings. It is most suited, with respect to NIST Speaker Recognition Evaluation (SRE) corpora, for evaluating speaker clustering performance with a big number of different speakers. The average duration of Fisher conversations is about 200 seconds, and they are all American English. In the computer simulations with results shown in the table in FIG. 5A, a subset of the Fisher corpora is used where the number of utterances is 1,500 and the number of speakers considered is 1,384. In the test set scenario used, the majority of speakers, e.g., more than 1,200, have pronounced just one utterance, few of them pronounced two utterances, and even fewer pronounced three utterances. It is particularly interesting to evaluate speaker-based speech clustering under the condition where a single or few utterance(s) per speaker is/are available.

The clustering performance shown in the table of FIG. 5A is clearly not as good as that shown in FIG. 4A and corresponding to the SRE08 test data set. However, it is quite evident that the results in terms of ARI on the Fisher data set are quite good for the "1conv" and "30 sec" test conditions. The clustering quality decreases as the duration of audio utterances is reduced.

FIG. 5B shows graphical plots illustrating the recorded averages of the classical and modified SWC, over multiple iterations, corresponding to the "1conv" test condition shown in the table of FIG. 5A. It is worth noting that the modified SWC (shown in dashed line) results in better clustering performance than the classical SWC. In particular, the number of clusters in the final output clustering pattern associated with the modified SWC is much closer to the actual number of speakers than the number of clusters in the final clustering pattern associated with the classical SWC. In other words, by introducing the penalty term, a better clustering performance is achieved with the Fisher test data set.

A person skilled in the art should appreciate that the processes described herein may be implemented in terms of software module(s), hardware module(s), firmware module(s), or a combination thereof. According to at least one example embodiment, the processes are performed by a speech processing device including at least one processor and at least one memory with computer software instructions stored thereon. The computer software instructions, when executed by the at least one processor, cause the speech processing device to perform the processes associated with clustering a plurality of voiceprints, e.g., i-vectors, of speech utterances into multiple clusters associated with multiple speakers of the speech utterances. The computer software instructions may also be stored on a non-transitory computer-readable medium.

While this invention has been particularly shown and described with references to example embodiments thereof, it will be understood by those skilled in the art that various changes in form and details may be made therein without departing from the scope of the invention encompassed by the appended claims.

What is claimed is:

1. A method of clustering a plurality of vector representations of speech utterances, by a speech processing device, into multiple clusters associated with multiple respective speakers of the speech utterances, the method comprising:
    defining a clustering pattern having multiple clusters, each of the multiple clusters including at least one of the plurality of vector representations;
    iteratively, (1) evaluating a clustering confidence score in terms of silhouette width criterion values associated with at least a subset of the plurality of vector representations, the clustering confidence score representing a clustering validation metric, and (2) updating the clustering pattern by merging a pair of nearest clusters, among clusters associated with the clustering pattern, into a single cluster, the pair of nearest clusters merged being determined based on a similarity score indicative of similarity between vector representations associated with different clusters;
    employing a modified silhouette width criterion function with a penalty term, the penalty term regularizing the silhouette width criterion values, the modified silhouette width criterion function enabling a stopping condition for the evaluating and updating; and
    providing an indication of a final clustering pattern to a speaker recognition engine, the final clustering pattern being determined as the clustering pattern corresponding to a highest value of the clustering confidence score, the final clustering pattern employed by the speaker recognition engine in associating speech utterances from at least one speaker of the multiple respective speakers with the at least one speaker.

2. A method according to claim 1, wherein the plurality of vector representations of the speech utterances are a plurality of i-vectors corresponding to the speech utterances.

3. A method according to claim 2, wherein one or more i-vectors correspond to each speech utterance.

4. A method according to claim 2, wherein evaluating the clustering confidence score includes:
    evaluating the silhouette width criterion values for the plurality of i-vectors; and
    calculating an average of the silhouette width criterion values.

5. A method according to claim 4, wherein the modified silhouette width criterion function, with the penalty term, is used for clusters having two vector representations.

6. A method according to claim 4, wherein the final clustering pattern is determined as the clustering pattern corresponding to the highest value of the average of the silhouette width criterion values.

7. A method according to claim 1, wherein the similarity score, between a first cluster and a second cluster, includes one of:
    a minimum value of a similarity metric evaluated between pairs of vector representations, with one vector representation of each pair being associated with the first cluster and the other vector representation being associated with the second cluster;
    a maximum value of a similarity metric evaluated between pairs of vector representations, with one vector representation of each pair being associated with the first cluster and the other vector representation being associated with the second cluster; or
    an average of similarity metric values evaluated between pairs of vector representations, with one vector representation of each pair being associated with the first cluster and the other vector representation being associated with the second cluster.

8. A method according to claim 1 further comprising employing the final clustering pattern in speaker-based segmentation of a speech signal.

9. An apparatus for clustering a plurality of speech utterances into multiple clusters associated with multiple respective speakers, the apparatus comprising:
a processor; and
a memory with computer code instructions stored therein, the processor and the memory, with the computer code instructions, being configured to cause the apparatus to:
define a clustering pattern having multiple clusters, each of the multiple clusters including at least one of the plurality of vector representations;
iteratively, (1) evaluate a clustering confidence score in terms of silhouette width criterion values associated with at least a subset of the plurality of vector representations, the clustering confidence score representing a clustering validation metric, and (2) update the clustering pattern by merging a pair of nearest clusters, among clusters associated with the clustering pattern, into a single cluster, the pair of nearest clusters merged being determined based on a similarity score indicative of similarity between vector representations associated with different clusters;
employ a modified silhouette width criterion function with a penalty term, the penalty term regularizing the silhouette width criterion values, the modified silhouette width criterion function enabling a stopping condition for the evaluating and updating; and
provide an indication of a final clustering pattern to a speaker recognition engine, the final clustering pattern being determined as the clustering pattern corresponding to a highest value of the clustering confidence score, the final clustering pattern employed by the speaker recognition engine in associating speech utterances from at least one speaker of the multiple respective speakers with the at least one speaker.

10. An apparatus according to claim 9, wherein the plurality of vector representations of the speech utterances are a plurality of i-vectors corresponding to the speech utterances.

11. An apparatus according to claim 10, wherein one or more i-vectors correspond to each speech utterance.

12. An apparatus according to claim 10, wherein in evaluating the clustering confidence score the processor and the memory, with the computer code instructions, are configured to further cause the apparatus to:
evaluate the silhouette width criterion values for the plurality of i-vectors; and
calculate an average of the silhouette width criterion values.

13. An apparatus according to claim 12, wherein a modified silhouette width criterion function, with the penalty term, is used for clusters having two vector representations.

14. An apparatus according to claim 12, wherein the final clustering pattern is determined as the clustering pattern corresponding to the highest value of the average of the silhouette width criterion values.

15. An apparatus according to claim 9, wherein the similarity score, between a first cluster and a second cluster, includes one of:
a minimum value of a similarity metric evaluated between pairs of vector representations, with one vector representation of each pair being associated with the first cluster and the other vector representation being associated with the second cluster;
a maximum value of a similarity metric evaluated between pairs of vector representations, with one vector representation of each pair being associated with the first cluster and the other vector representation being associated with the second cluster; or
an average of similarity metric values evaluated between pairs of vector representations, with one vector representation of each pair being associated with the first cluster and the other vector representation being associated with the second cluster.

16. An apparatus according to claim 9, wherein the processor and the memory, with the computer code instructions, are further configured to cause the apparatus to employ the final clustering pattern in speaker-based segmentation of a speech signal.

17. A non-transitory computer-readable medium with computer code software, for clustering a plurality of speech utterances into multiple clusters associated with multiple respective speakers, stored thereon, the computer code software when executed by a processor causes an apparatus to:
define a clustering pattern having multiple clusters, each of the multiple clusters including at least one of the plurality of vector representations;
iteratively, (1) evaluate a clustering confidence score in terms of silhouette width criterion values associated with at least a subset of the plurality of vector representations, the clustering confidence score representing a clustering validation metric, and (2) update the clustering pattern by merging a pair of nearest clusters, among clusters associated with the clustering pattern, into a single cluster, the pair of nearest clusters merged being determined based on a similarity score indicative of similarity between vector representations associated with different clusters;
employ a modified silhouette width criterion function with a penalty term, the penalty term regularizing the silhouette width criterion values, the modified silhouette width criterion function enabling a stopping condition for the evaluating and updating; and
provide an indication of a final clustering pattern to a speaker recognition engine, the final clustering pattern being determined as the clustering pattern corresponding to a highest value of the clustering confidence score, the final clustering pattern employed by the speaker recognition engine in associating speech utterances from at least one speaker of the multiple respective speakers with the at least one speaker.

18. A non-transitory computer-readable medium according to claim 17, wherein the plurality of vector representations of the speech utterances are a plurality of i-vectors corresponding to the speech utterances.

19. A method according to claim 1 further comprising employing the final clustering pattern in speaker recognition by the speaker recognition engine.

20. An apparatus according to claim 9, wherein the processor and the memory, with the computer code instructions, are further configured to cause the apparatus to employ the final clustering pattern in speaker recognition by the speaker recognition engine.

* * * * *